United States Patent
Ishii et al.

(10) Patent No.: US 9,298,239 B2
(45) Date of Patent: Mar. 29, 2016

(54) CONTROL DEVICE, POWER SUPPLY DEVICE, AND METHOD FOR CONTROLLING POWER

(71) Applicant: FUJITSU LIMITED, Kawasaki-shi, Kanagawa (JP)

(72) Inventors: Takanori Ishii, Nerima (JP); Kentarou Yuasa, Chofu (JP); Shinnosuke Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 321 days.

(21) Appl. No.: 13/916,695

(22) Filed: Jun. 13, 2013

(65) Prior Publication Data

US 2014/0006834 A1 Jan. 2, 2014

(30) Foreign Application Priority Data

Jun. 29, 2012 (JP) .................. 2012-146720

(51) Int. Cl.
| | |
|---|---|
| *G06F 1/26* | (2006.01) |
| *G06F 1/30* | (2006.01) |
| *G06F 12/08* | (2006.01) |
| *G06F 1/28* | (2006.01) |
| *G06F 11/14* | (2006.01) |
| *G06F 11/20* | (2006.01) |

(52) U.S. Cl.
CPC .. *G06F 1/30* (2013.01); *G06F 1/28* (2013.01); *G06F 11/1441* (2013.01); *G06F 12/0802* (2013.01); *G06F 12/0866* (2013.01); *G06F 11/2015* (2013.01); *G06F 12/0868* (2013.01); *G06F 12/0873* (2013.01); *G06F 2212/2228* (2013.01); *Y02B 60/1225* (2013.01)

(58) Field of Classification Search
CPC ... G06F 1/30; G06F 11/2015; G06F 12/0866; G06F 12/0868; G06F 12/0873
USPC .................. 713/300, 320, 330, 340
See application file for complete search history.

(56) References Cited

U.S. PATENT DOCUMENTS

| | | | |
|---|---|---|---|
| 2004/0103238 A1* | 5/2004 | Avraham et al. .............. | 711/102 |
| 2005/0259460 A1 | 11/2005 | Sone | |
| 2010/0019735 A1 | 1/2010 | Hori et al. | |
| 2012/0159210 A1* | 6/2012 | Hosaka ........................ | 713/320 |
| 2012/0324274 A1* | 12/2012 | Hori ......................... | G06F 1/30 |
| | | | 714/6.1 |

FOREIGN PATENT DOCUMENTS

| | | |
|---|---|---|
| JP | 63-257045 | 10/1988 |
| JP | 2004-78963 | 3/2004 |
| JP | 2005-332471 | 12/2005 |
| JP | 2007-124782 | 5/2007 |
| JP | 2010-26941 | 2/2010 |

* cited by examiner

*Primary Examiner* — Michael J Brown
(74) *Attorney, Agent, or Firm* — Staas & Halsey LLP

(57) ABSTRACT

There is provided a control device which includes a cache memory configured to temporarily store data, a nonvolatile memory configured to store a copy of the data stored in the cache memory, a battery configured to supply power to the cache memory in a case of a power failure, a data save processing unit configured to save data stored in a backup target region of the cache memory to the nonvolatile memory in the case of the power failure, and a charge control unit configured to charge the battery up to a target amount of charge which is determined on the basis of a size of the backup target region.

12 Claims, 11 Drawing Sheets

FIRST STATE

SECOND STATE

THIRD STATE

FOURTH STATE

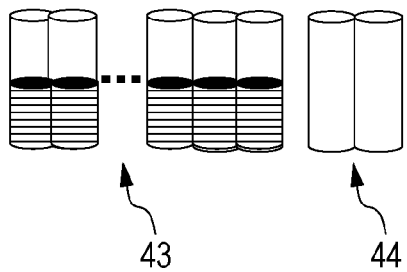
FIG. 11 FIRST STATE
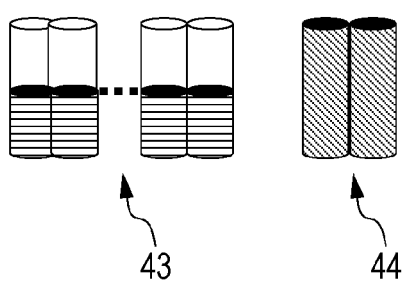
FIG. 12 SECOND STATE
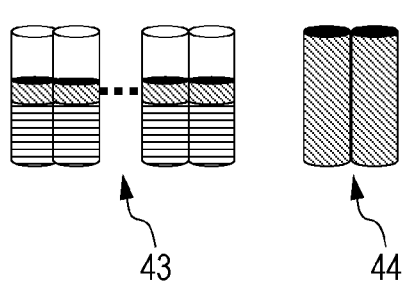
FIG. 13 THIRD STATE
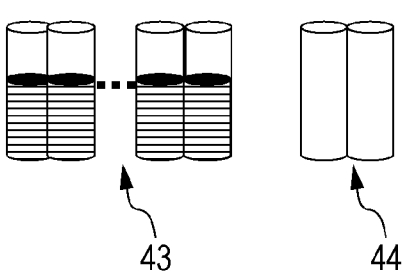
FIG. 14 FOURTH STATE

FIG. 16

|  | Li-ION | Li-ION CAPACITOR | ELECTRIC DOUBLE-LAYER CAPACITOR |
|---|---|---|---|
| ENERGY DENSITY | HIGH | MODERATE | LOW |
| LIMIT TO NUMBER OF TIMES OF CHARGE AND DISCHARGE | PROVIDED | NOT PROVIDED | NOT PROVIDED |
| CHARGE TIME | SEVERAL HOURS | SEVERAL MINUTES | SEVERAL SECONDS |
| LOWER LIMIT VOLTAGE | PROVIDED (HIGH VOLTAGE IS TO BE USED) | PROVIDED (HIGH VOLTAGE IS TO BE USED) | NOT PROVIDED |

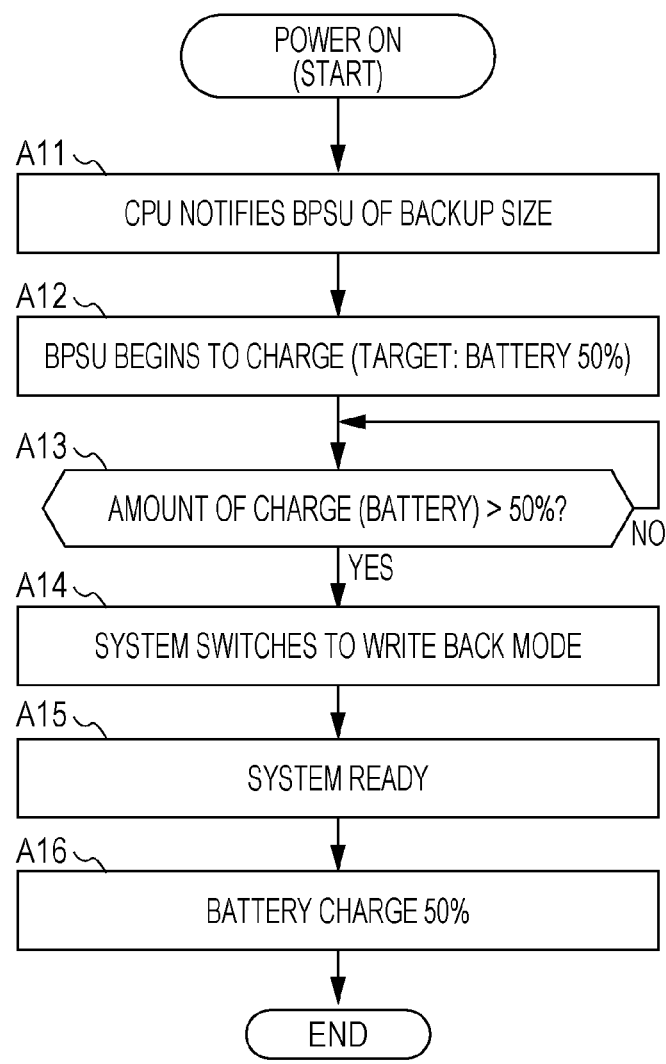

CONTROL DEVICE, POWER SUPPLY DEVICE, AND METHOD FOR CONTROLLING POWER

CROSS-REFERENCE TO RELATED APPLICATION

This application is based upon and claims the benefit of priority of the prior Japanese Patent Application No. 2012-146720, filed on Jun. 29, 2012, the entire contents of which are incorporated herein by reference.

FIELD

The embodiment discussed herein is related to a control device, a power supply device, and a method for controlling power.

BACKGROUND

Currently, in storage apparatuses, a backup system that saves user data in a cache memory to a nonvolatile memory in order to protect the user data in the cache memory in the case of, for example, a power failure is known. For example, in an entry model storage apparatus, an electric double-layer capacitor (hereinafter referred to as a capacitor) is included, and, in the case of a power failure, user data in a cache memory is copied and saved to a nonvolatile memory using power supplied from the capacitor. Capacitors generally have longer lives than batteries, and the frequency of performing maintenance may be reduced by using such capacitors as backup power supplies.

Examples of the related art are disclosed in Japanese Laid-open Patent Publication No. 2005-332471 and Japanese Laid-open Patent Publication No. 2007-124782.

SUMMARY

According to an aspect of the invention, a control device includes a cache memory configured to temporarily store data, a nonvolatile memory configured to store a copy of the data stored in the cache memory, a battery configured to supply power to the cache memory in a case of a power failure, a data save processing unit configured to save data stored in a backup target region of the cache memory to the nonvolatile memory in the case of the power failure; and a charge control unit configured to charge the battery up to a target amount of charge which is determined on the basis of a size of the backup target region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating a second method for operating the BPSU in the storage apparatus as an example of the embodiment;

FIG. 12 is a diagram illustrating the second method for operating the BPSU in the storage apparatus as an example of the embodiment;

FIG. 13 is a diagram illustrating the second method for operating the BPSU in the storage apparatus as an example of the embodiment;

FIG. 14 is a diagram illustrating the second method for operating the BPSU in the storage apparatus as an example of the embodiment;

FIG. 16 is a diagram illustrating the characteristics of a lithium-ion battery, a lithium-ion capacitor, and a capacitor; and FIG. 17 is a flowchart illustrating process performed by a BPSU during activation of a storage apparatus according to a third modification of the embodiment.

DESCRIPTION OF EMBODIMENT

In these years, however, the size of a memory region (hereinafter referred to as a backup size), which is a backup target, that stores user data in a cache memory is increasing, and, accordingly, the time taken for the backup is also increasing. For example, when the backup size increases from 4 GB to 8 GB, the time taken for the backup of the backup target region becomes twice as long.

When the time taken for the backup becomes twice as long, the capacity of a capacitor is supposed to become twice as large, but, in this case, the size of the capacitor becomes large, thereby making it difficult to store the capacitor in a current apparatus size. That is, capacitors may no longer provide a satisfactory measure against an increase in the backup size. Therefore, instead of a capacitor, a battery whose energy density is higher than that of the capacitor may be used as a backup power supply.

However, when a battery is used under the same conditions (for example, environmental temperature and voltage) as a capacitor, the life of the battery becomes short, thereby posing a problem in that it is difficult to reduce the frequency of maintenance. Therefore, it is desired that the life of a battery is prolonged.

(A) Embodiment

A control device, a power supply device, and a method for controlling power according to an embodiment will be described hereinafter with reference to the drawings. It is to be understood that the embodiment described hereinafter is merely an example and is not intended to exclude various modifications and applications of the technology that are not specified therein. That is, the embodiment may be modified in various ways (such as by combining the embodiment with each modification) without deviating from the scope thereof. It is to be noted that, in each figure, functions other than those of illustrated components may be included.

Figure 1:
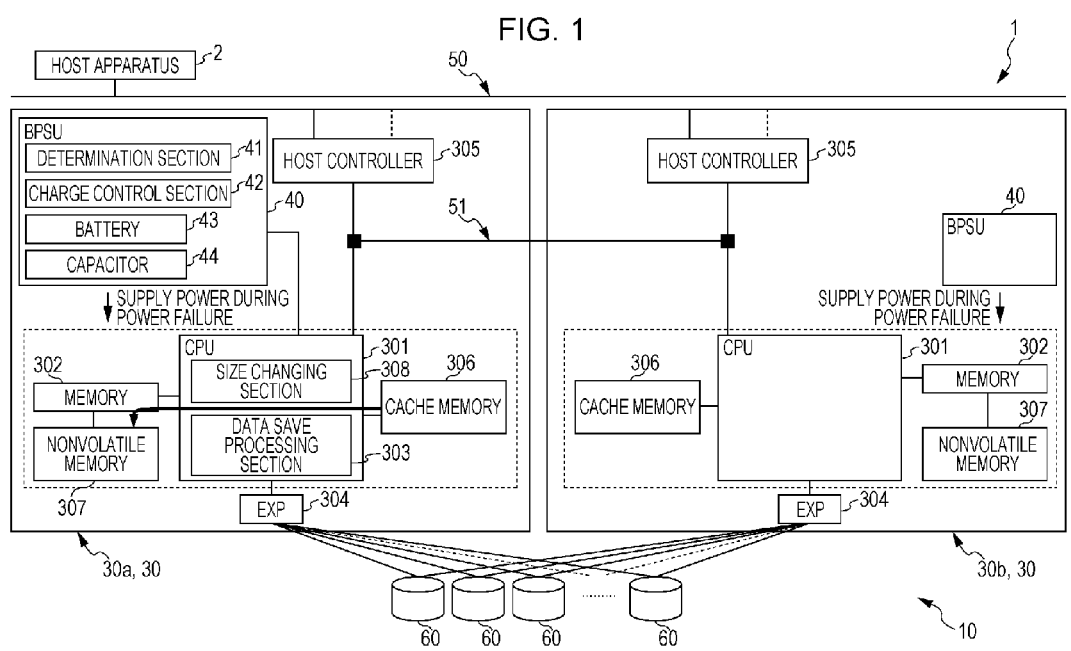
FIG. 1 is a diagram illustrating the functional configuration of a storage system including a storage apparatus as an example of an embodiment.
Figure 2:
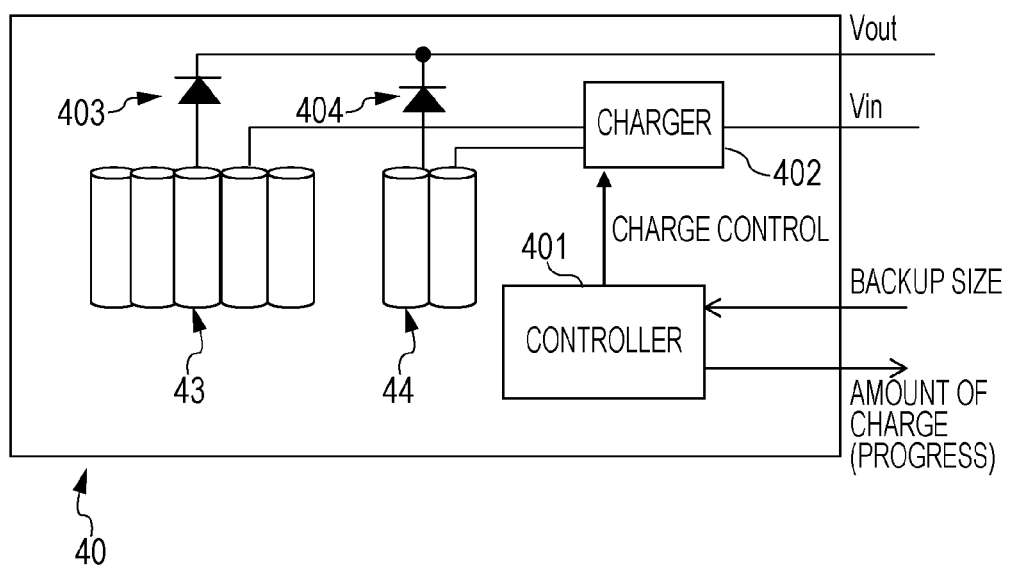
FIG. 2 is a diagram illustrating the hardware configuration of a backup power supply unit (BPSU) included in the storage apparatus as an example of the embodiment.

FIG. 1 is a diagram illustrating the functional configuration of a storage system 1 including a storage apparatus 10 as an example of the embodiment, and FIG. 2 is a diagram illustrating the hardware configuration of a backup power supply unit (BPSU) 40 in the storage apparatus 10.

As illustrated in FIG. 1, the storage system 1 includes the storage apparatus 10 and one or more (one in the example illustrated in FIG. 1) host apparatuses 2. In the storage system 1, the host apparatus 2 and the storage apparatus 10 are connected to each other through a network 50 in such a way as to enable communication. The host apparatus 2 and the storage apparatus 10 are connected to each other by, for example, an Internet Small Computer System Interface (iSCSI). The network 50 is, for example, a communication line such as a local area network (LAN).

The host apparatus 2 is, for example, a computer (an information processing apparatus, or a higher-level apparatus) having a server function, and communicates various pieces of data such as Small Computer System Interface (SCSI) commands and responses with the storage apparatus 10 using Transmission Control Protocol/Internet Protocol (TCP/IP) or the like. The host apparatus 2 writes or reads data to or from a memory region provided by the storage apparatus 10 by transmitting a disk access command such as read or write to the storage apparatus 10.

As illustrated in FIG. 1, the storage apparatus 10 includes controller modules (hereinafter referred to as CMs) 30a and 30b, expanders 304, and memory device 60, and a drive enclosure, which is not illustrated, or the like is connected thereto.

The memory devices 60 are memory devices that store data such that the data may be read and written, and function as memory units that may store data received from the host apparatus 2. In the embodiment, an example in which hard disk drives (HDDs) are used as the memory devices 60 will be described. In the following description, the memory devices 60 may be referred to as HDDs 60.

Although the four HDDs 60 are included in the storage apparatus 10 in FIG. 1 for the sake of convenience, the number of HDDs 60 is not limited to this, and three or less or five or more HDDs 60 may be included. The storage apparatus 10 may be a redundant arrays of inexpensive disks (RAID) apparatus that combines the plurality of HDDs 60 and that manages the HDDs 60 as a single redundant storage device.

The expanders 304 are interfaces used for connecting to the HDDs 60, the drive enclosure, which is not illustrated, or the like in such a way as to enable communication, and each include a device adapter or the like. The expanders 304 are, for example, Serial Attached SCSI (SAS) expanders, and connect the memory devices 60 to the CMs 30a and 30b. The CMs 30a and 30b write and read data to and from the HDDs 60 through the expanders 304, respectively.

The CMs 30a and 30b are controllers (control devices) that control operations inside the storage apparatus 10, and receive commands such as read and write from the host apparatus 2 to perform various types of control. The CMs 30a and 30b are connected to the network 50 through host controllers 305, respectively. The CMs 30a and 30b perform data access control of the HDDs 60 through the expanders 304 or the like in accordance with the disk access commands such as read and write received from the host apparatus 2.

As illustrated in FIG. 1, the CMs 30a and 30b each include the host controller 305, a central processing unit 301, a memory 302, a cache memory 306, a nonvolatile memory 307, the expander 304, and the BPSU 40. That is, the CMs 30a and 30b have the same configuration. The CMs 30a and 30b are connected to each other through a communication line 51, and therefore the CMs 30a and 30b form a redundant configuration.

In the following description, when a particular one of the plurality of CMs is referred to, a reference numeral 30a or 30b is used, but a reference numeral 30 is also used for referring to an arbitrary CM.

In the drawings, the same reference numerals refer to the same or substantially the same components, and therefore detailed description of such components is omitted.

The host controller 305 is an interface controller (a communication adapter) connected to the host apparatus 2 or the like in such a way as to enable communication, and, more specifically, for example, a channel adapter. The host controller 305 receives data transmitted from the host apparatus 2 or the like and transmits data output from the CM 30 to the host apparatus 2 or the like. That is, the host controller 305 controls input and output (I/O) of data to and from an external apparatus such as the host apparatus 2.

The memory 302 is a storage device including a read-only memory (ROM) and a random-access memory (RAM). Software programs relating to various types of control in the storage apparatus 10 and data for the software programs are written to the ROM of the memory 302. That is, programs relating to backup control of cache data executed by the storage apparatus 10 in the case of a power failure and the like are also written to the ROM.

The programs in the memory 302 are read and executed by the CPU 301. The RAM of the memory 302 is used as a primary storage memory or a working memory.

The cache memory 306 stores data received from the host apparatus 2 or data read from the HDDs 60. Data received from the host apparatus 2 and written to the HDDs 60 (write data) is stored in a certain region (user region) of the cache memory 306 and then transferred to the HDDs 60. In the storage system 1, the certain region of the cache memory 306 for storing the write data (write cache data) is determined as a backup target region, and a copy of the data stored in the backup target region is stored in the nonvolatile memory 307 (memory backup). The nonvolatile memory 307 will be described later. The backup target region also stores a copy of write data received from the cache memory 306 of another CM 30 to achieve redundancy between the plurality of CMs 30.

In the following description, the size of the backup target region of the cache memory 306 may be referred to as a backup size. The backup size is determined or changed by a size changing section 308, which will be described later.

Data read from the HDDs 60 (read data) is stored in a region of the cache memory 306 for storing the read data, and then transmitted to the host apparatus 2.

The nonvolatile memory 307 is a memory such as a flash memory that holds data even when power is not supplied thereto. The nonvolatile memory 307 is not limited to the flash memory, and may be, for example, one of various modifications such as a magnetoresistive RAM, a phase-change RAM (PRAM), and ferroelectric memory.

In the case of a power failure of the storage apparatus 10, data stored in the backup target region of the cache memory 306 is stored in the nonvolatile memory 307 by a data save processing section 303, which will be described later.

The CPU 301 is a processing device that performs various types of control and calculation, and achieves various functions by executing the programs stored in the memory 302.

For example, the CPU 301 includes a function as a system control unit, and achieves various functions such as a RAID function, an alarm monitoring function, a path control function, and a Remote Access Service (RAS) function in the storage apparatus 10. The CPU 301 also includes functions as the size changing section 308 and the data save processing section 303.

The size changing section 308 determines the size (backup size) of the back target region of the cache memory 306 or changes the size of the backup target region to a determined size.

The size changing section 308 dynamically determines and changes the size of a write cache region that stores write data in accordance with the operation condition of the CM 30. For example, the size changing section 308 determines the size of the write cache region on the basis of the percentage (use ratio) occupied by the write data stored in the write cache region of the cache memory 306, the size of the write data received from the host apparatus 2, and the like. Various known methods may be used by the size changing section 308 as a method for determining the size of the write cache region and a method for changing the size of the write cache region, and detailed description of these methods is omitted.

The size changing section 308 transmits the size of the write cache region after the change to a determination section 41 (described later) of the BPSU 40 as a backup size.

When a power failure has occurred in the storage apparatus 10 and power is no longer supplied to the CM 30 from a power supply unit, which is not illustrated, the data save processing section 303 causes the nonvolatile memory 307 to store a copy of data stored in the backup target region of the cache memory 306. The memory backup of the cache memory 306 performed by the data save processing section 303 may be achieved using various known methods, and detailed description of these methods is omitted.

The copied data of the backup target region of the cache memory 306 stored in the nonvolatile memory 307 by the data save processing section 303 is written back to the cache memory 306, as occasion calls, when the storage apparatus 10 has recovered.

The storage apparatus 10 may selectively operate in one of two operation modes, namely a write through mode and a write back mode, and the CPU 301 of the CM 30 switches the operation mode between the write through mode and the write back mode.

The write through mode is a mode in which writing is completed when write data received from the host apparatus 2 has been actually written to the HDDs 60, and after the write data is written to the HDDs 60, the host apparatus 2 that has transmitted a write command is notified of the completion of the writing. In the storage apparatus 10, the write through mode is established in a state in which protection of write data is determined to be incomplete just by writing the write data to the cache memory 306,. For example, when the total amount of change of a battery 43 and a capacitor 44 of the BPSU 40, which will be described later, is smaller than a target amount of charge (described later) during activation of the storage apparatus 10 or the like, the write through mode is established. This is because when a power failure occurs in such a state, it is difficult to protect all pieces of data stored in the backup target region of the cache memory 306.

When a state has been detected for some reason in which protection of data is incomplete just by writing data to the cache memory 306, the write through mode is established. On the other hand, the write back mode is a mode in which writing is completed when the write data has been stored in the cache memory 306, and when the write data has been stored in the cache memory 306, the host apparatus 2 that has transmitted a write command is notified of the completion of the writing. In the write back mode, it seems to the host apparatus 2 that a write process is completed at higher speed than in the write through mode.

The write through mode and the write back mode may be achieved by various known methods, and detailed description of these methods is omitted. The programs for realizing the functions as the size changing section 308, the data save processing section 303, and the like are recorded on a computer-readable recording medium such as a flexible disk, a compact disc (CD) (a compact disc read-only memory (CD-ROM), a compact disc-recordable (CD-R), a compact disc-rewritable (CD-RW), or the like), a digital versatile disc (DVD) (a DVD-ROM, a DVD-RAM, a DVD-R, a DVD+R, a DVD-RW, a DVD+RW, a high-definition (HD) DVD, or the like), a Blu-ray Disc (registered trademark), a magnetic disk, an optical disk, or a magneto-optical disk, and provided. The computer reads the programs from the recording medium and uses the programs by transferring the programs to an internal storage device or an external storage device and storing the programs in the internal storage device or the external storage device. Alternatively, the programs may be recorded, for example, in a storage device (recording medium) such as a magnetic disk, an optical disk, or a magneto-optical disk, and provided for the computer from the storage device through a communication path.

When the functions as the size changing section 308, the data save processing section 303, and the like are to be achieved, the programs stored in the internal storage device (the memory 302 or the like in the embodiment) are executed by a microprocessor (the CPU 301 in the embodiment) of the computer. At this time, the programs recorded on the recording medium may be read and executed by the computer, instead. In the embodiment, a "computer" is a concept including hardware and an operating system, and refers to hardware that operates under control of the operating system. When the operating system is not used and the hardware is operated only by an application program, the hardware itself corresponds to the computer. The hardware includes at least a microprocessor such as a CPU and a unit for reading the computer programs recorded on the recording medium, and, in the embodiment, the CM 30 and a controller 401 of the BPSU 40 have the function of the computer.

The BPSU 40 is a power supply device that supplies power at least to a part of the CM 30 in the case of a power failure of the storage apparatus 10. The BPSU 40 supplies power to, for example, the CPU 301, the memory 302, the cache memory 306, and the nonvolatile memory 307 in the case of a power failure of the storage apparatus 10. As illustrated in FIG. 2, the BPSU 40 includes the battery 43, the capacitor 44, the controller 401, a charger 402, and rectifier circuits 403 and 404. That is, the BPSU 40 has a hybrid configuration including the battery 43 and the capacitor 44.

The battery 43 is, for example, a secondary battery such as a lead-acid battery, a nickel-hydrogen (Ni—H) battery, or a lithium-ion (Li-ion) battery. The capacitor 44 is an electric double-layer capacitor. The battery 43 and the capacitor 44 may store electricity through charging, and may be repeatedly used by charging again after discharge.

The battery 43 has larger charge capacity than the capacitor 44, and may supply a larger amount of power than the capacitor 44. In general, the battery 43 has a characteristic that the battery 43 deteriorates in accordance with the number of times of charge and discharge. On the other hand, the capacitor 44 has low internal resistance, and therefore may perform charge and discharge in a shorter period of time than the battery 43. The capacitor 44 has a characteristic that the capacitor 44 does not significantly deteriorate due to charge and discharge and has a long life compared to the battery 43.

The battery 43 and the capacitor 44 are connected in parallel with each other. In the embodiment, the full charge capacity of the capacitor 44 is about 10% of the sum (the total full charge capacity) of the full charge capacity of the battery 43 and the full charge capacity of the capacitor 44. The rectifier circuits 403 and 404 are, for example, diodes, and rectify current supplied from the battery 43 and the capacitor 44, respectively.

The charger 402 charges the battery 43 and the capacitor 44 or causes the battery 43 and the capacitor 44 to discharge in accordance with control of the controller 401. The charger 402 charges the battery 43 or causes the battery 43 to discharge such that a certain charge capacity (%) specified from the controller 401 is achieved. The function as the charger 402 may be achieved by various known methods, and description of these methods is omitted.

The controller 401 is a processing device that includes a processor and a memory, which are not illustrated, and controls (charge control) the charger 402 to control charge and discharge of the battery 43 and the capacitor 44. As illustrated in FIG. 1, the controller 401 has functions as the determination section 41 and a charge control section 42. More specifically, the processor executes programs stored in the memory to achieve the functions as the determination section 41 and the charge control section 42.

The programs for realizing the functions as the determination section 41 and the charge control section 42 are recorded, for example, on a computer-readable recording medium such as a flexible disk, a CD (a CD-ROM, a CD-R, a CD-RW, or the like), a DVD (a DVD-ROM, a DVD-RAM, a DVD-R, a DVD+R, a DVD-RW, a DVD+RW, a HD DVD, or the like), a Blu-ray Disc, a magnetic disk, an optical disk, or a magneto-optical disk, and provided. The computer reads the programs from the recording medium and uses the programs by transferring the programs to an internal storage device or an external storage device and storing the programs in the internal storage device or the external storage device. Alternatively, the programs may be recorded, for example, in a storage device (recording medium) such as a magnetic disk, an optical disk, or a magneto-optical disk, and provided for the computer from the storage device through a communication path.

When the functions as the determination section 41 and the charge control section 42 are to be achieved, the programs stored in the internal storage device (a memory, which is not illustrated, or the like in the embodiment) are executed by a microprocessor (a processor included in the controller 401 in the embodiment) of the computer. At this time, the programs recorded on the recording medium may be read and executed by the computer, instead.

The determination section 41 determines the target amount of charge of the battery 43 on the basis of the size (backup size) of the backup target region of the cache memory 306. For example, a conversion table (conversion information) in which backup sizes and target amounts of charge are associated with each other in advance is stored in the memory of the controller 401, which is not illustrated. The determination section 41 refers to the conversion table on the basis of the backup size transmitted from the size changing section 308 and determines the target amount of charge according to the backup size. In the embodiment, the target amount of charge is represented, for example, as a percentage (charge ratio; unit: %) relative to full charge.

In addition, the determination section 41 notifies the charge control section 42 of the determined target amount of charge. The charge control section 42 controls the charger 402 to charge the battery 43 and the capacitor 44 or cause the battery 43 and the capacitor 44 to discharge to achieve desired amounts of charge of the battery 43 and the capacitor 44. In the following description, the sum of the amount of charge of the battery 43 and the amount of charge of the capacitor 44 may be referred to as the total amount of charge.

When the amount of charge of the battery 43 is smaller than the target amount of charge, the charge control section 42 begins to charge both the battery 43 and the capacitor 44 and continues the charging until the total amount of charge reaches the target amount of charge. When the total amount of charge has reached the target amount of charge, the charge control section 42 notifies the CPU 301 of completion of the charging. Thereafter, the charge control section 42 further charges the battery 43 until the amount of charge of the battery 43 reaches the target amount of charge. When the amount of charge of the battery 43 alone has reached the target amount of charge, the charge control section 42 causes the capacitor 44 to discharge. In doing so, deterioration of the capacitor 44 may be suppressed.

When the total amount of charge is larger than the target amount of charge, the charge control section 42 causes the capacitor 44 to discharge first, and then causes the battery 43 to discharge until the amount of charge of the battery 43 alone reaches the target amount of charge. By giving priority to the capacitor 44 over the battery 43 in charge and discharge, the number of times of charge and discharge of the battery 43 may be reduced, thereby suppressing deterioration of the battery 43.

Figure 3:
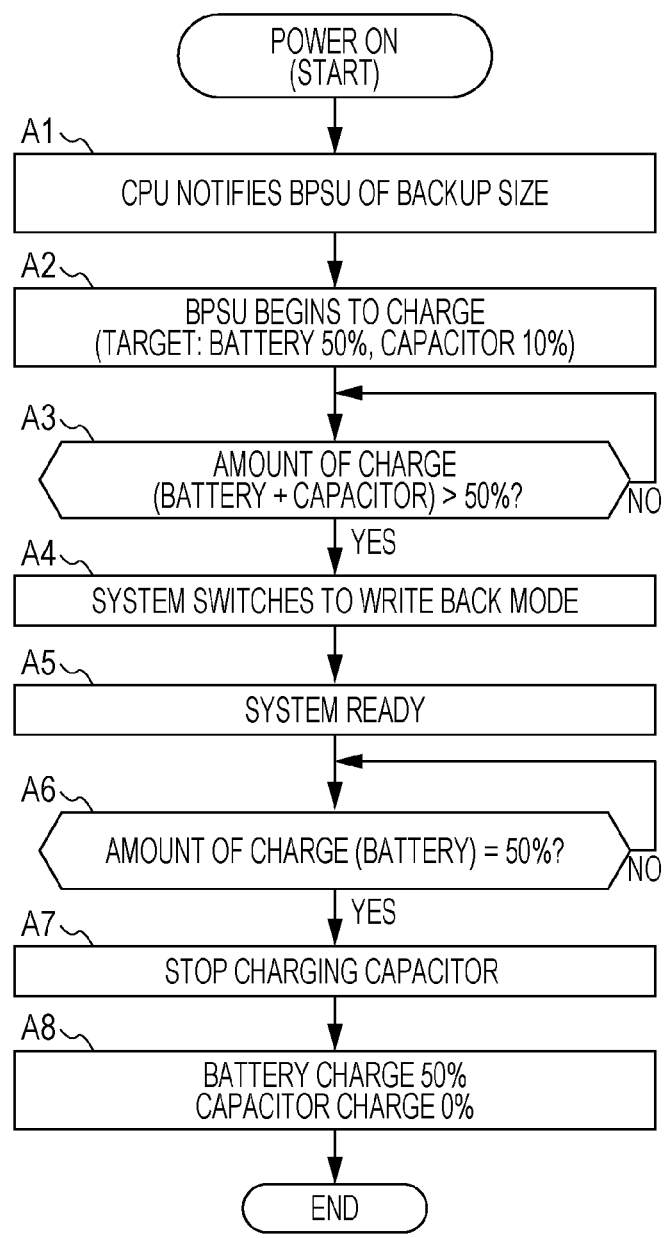
FIG. 3 is a flowchart illustrating a process performed by the BPSU during activation of the storage apparatus as an example of the embodiment.

A process performed by the BPSU 40 during activation of the storage apparatus 10 as an example of the embodiment configured in the above-described manner will be described with reference to a flowchart (steps A1 to A8) of FIG. 3. When power is supplied to the storage apparatus 10 or the storage apparatus 10 is reactivated, the size changing section 308 (the CPU 301) of the CM 30 notifies the determination section 41 in the BPSU 40 of the backup size (for example, 5 GB) (step A1). In the BPSU 40, the determination section 41 refers to the conversion table on the basis of the backup size, and determines the target amount of charge. In this example, the target amount of charge is assumed to be 50% of the total full charge capacity. In the following description, values in parentheses indicate percentages relative to the total full charge capacity.

In the BPSU 40, the charge control section 42 controls the charger 402 to begin to charge the battery 43 and the capacitor 44. More specifically, the battery 43 is charged to the target amount of charge (50%), and the capacitor 44 is charged to full charge (10%) (step A2). In this state, the storage apparatus 10 is operating in the write through mode.

The charge control section 42 checks whether or not the total amount of charge of the battery 43 and the capacitor 44 is larger than the target amount of charge (step A3). When the total amount of charge is smaller than or equal to the target amount of charge (refer to the NO route in step A3), step A3 is repeatedly performed until the total amount of charge becomes larger than the target amount of charge. When the total amount of charge is larger than the target amount of charge (refer to the YES route in step A3), the charge control section 42 notifies the CPU 301 of completion of the charge, and the CPU 301 causes the storage apparatus 10 to enter the write back mode (step A4).

By charging the capacitor 44, which may be fully charged in a short period of time, in parallel with the battery 43, the time taken for the total amount of charge to reach the target amount of charge may be reduced, thereby reducing the time taken for the storage apparatus 10 to switch from the write through mode to the write back mode. The storage apparatus 10 is now in a system ready state (step A5), in which the function as the storage apparatus 10 may be achieved.

The charge control section 42 checks whether or not the amount of charge of the battery 43 has reached the target amount of charge (step A6). When the amount of charge of the battery 43 is smaller than the target amount of charge (refer to the NO route in step A6), step A6 is repeatedly performed until the amount of charge of the battery 43 becomes larger than the target amount of charge. When the amount of charge of the battery 43 has reached the target amount of charge (refer to the YES route in step A6), the charge control section 42 stops charging the capacitor 44 (step A7). The charge control section 42 then causes the capacitor 44 to discharge until the amount of charge of the capacitor 44 becomes 0%. Therefore, the operation begins while the amount of charge of the battery 43 is the target amount of charge (50%) and the amount of charge of the capacitor 44 is 0% (step A8), and the process ends.

Figure 4:
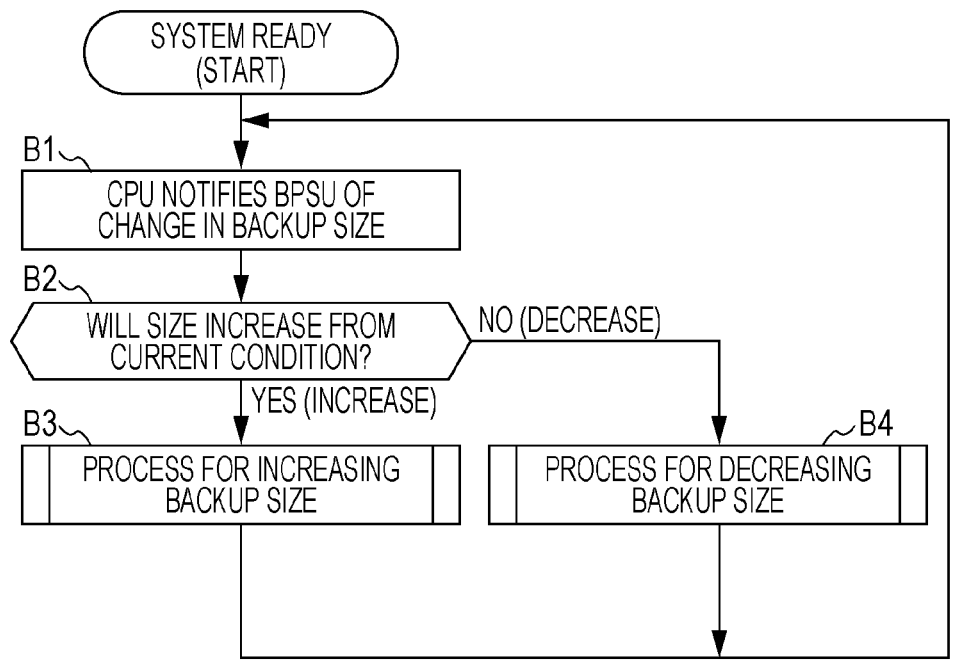
FIG. 4 is a flowchart illustrating a process performed by the BPSU in accordance with a change in a backup size in the storage apparatus as an example of the embodiment.
Figure 5:
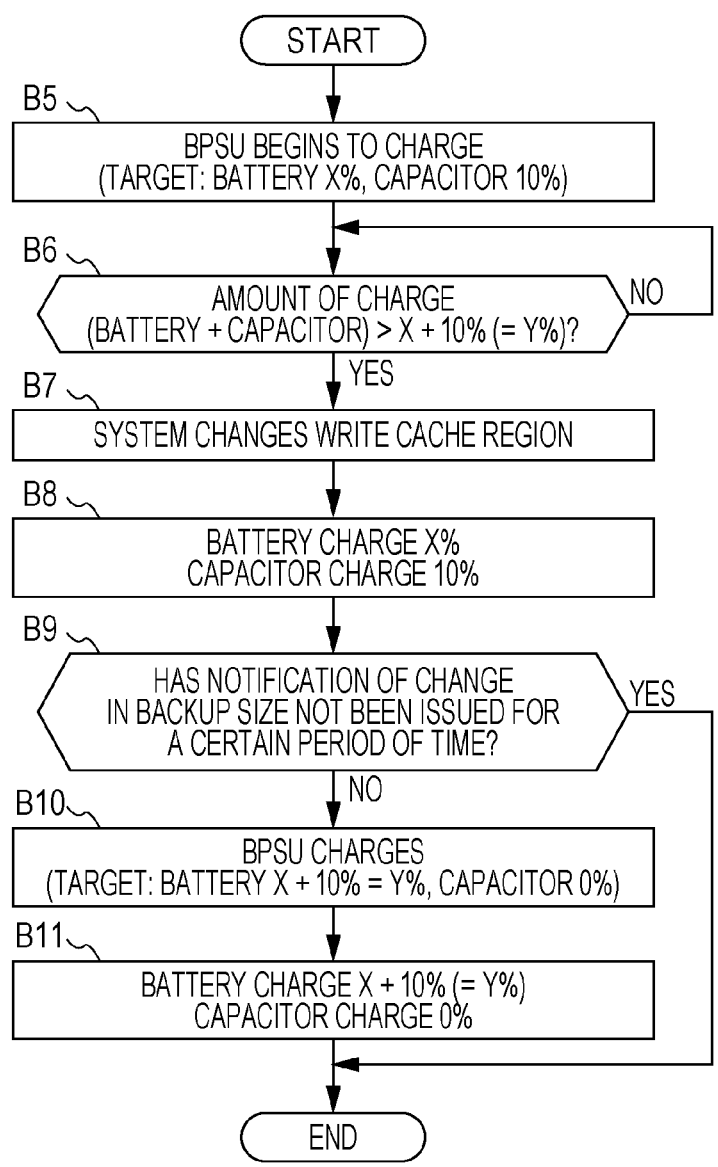
FIG. 5 is a flowchart illustrating a process performed by the BPSU in accordance with a change in the backup size in the storage apparatus as an example of the embodiment.
Figure 6:
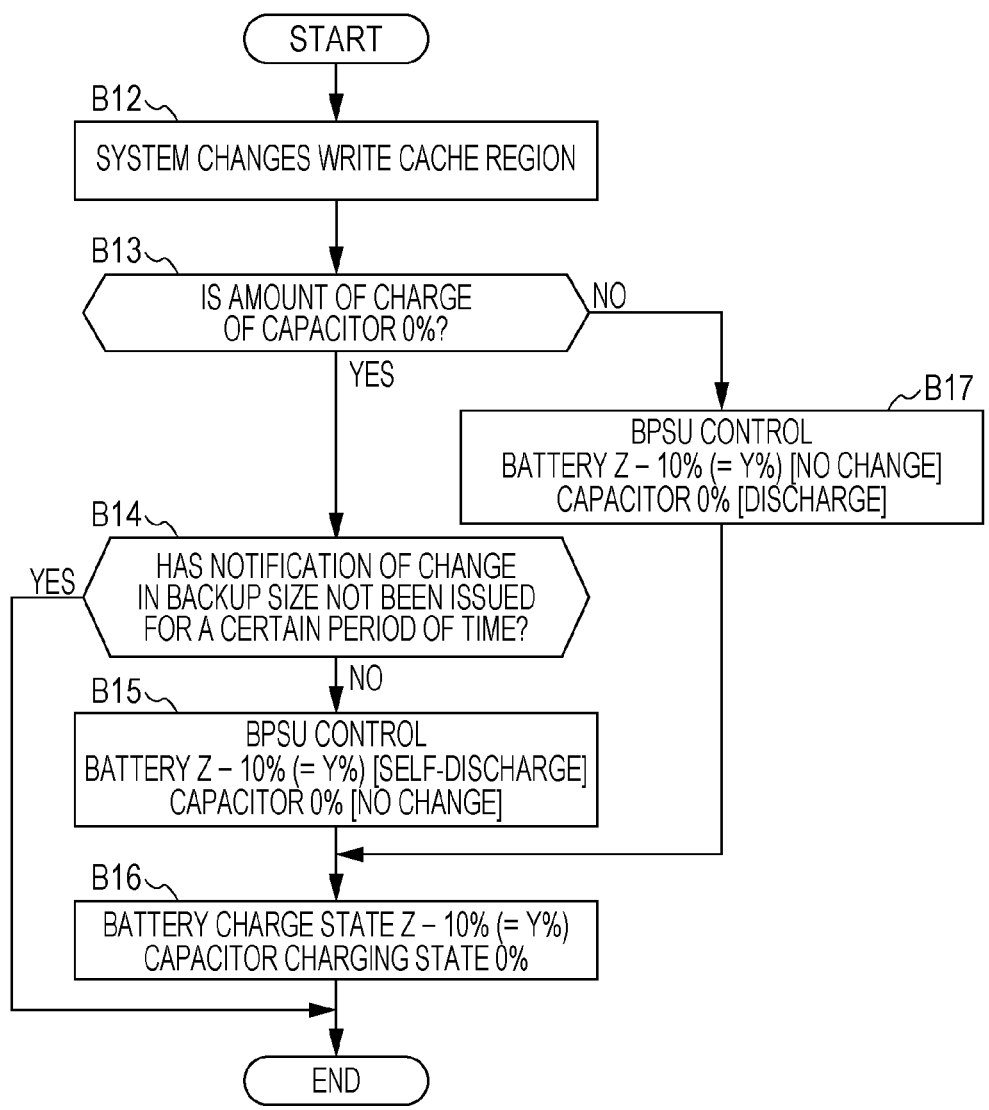
FIG. 6 is a flowchart illustrating a process performed by the BPSU in accordance with a change in the backup size in the storage apparatus as an example of the embodiment.

Next, a process performed by the BPSU 40 in accordance with a change in the backup size of the storage apparatus 10 as an example of the embodiment will be described with reference to flowcharts (steps B1 to B17) of FIGS. 4 to 6. FIG. 4 illustrates processing in steps B1 to B4, FIG. 5 illustrates processing in B5 to B11, and FIG. 6 illustrates processing in steps B12 to B17. In this example, too, the full charge capacity of the capacitor 44 is assumed to be about 10% of the sum (total full charge capacity) of the full charge capacity of the battery 43 and the full charge capacity of the capacitor 44.

In the system ready state, the size changing section 308 (the CPU 301) of the CM 30 determines that the size of the backup target region of the cache memory 306 is to be changed. The size changing section 308 determines a backup size (a GB) after the change, and notifies the determination section 41 of the BPSU 40 of the backup size (a GB) after the change (step B1). At this moment, the size changing section 308 does not change the size of the backup target region of the cache memory 306 yet.

In the BPSU 40, the determination section 41 refers to the conversion table on the basis of the backup size, and determines the target amount of charge [Y %] corresponding to the backup size (a GB). In the BPSU 40, a timer, which is not illustrated, measures time elapsed since the size changing section 308 notified the determination section 41 of the backup size after the change.

Next, the charge control section 42 compares this new backup size with a current backup size (step B2). That is, the charge control section 42 checks whether or not the backup size will increase from the current state. For example, the BPSU 40 stores the backup size transmitted from the CPU 301 in the memory or the like, and compares the backup size with a backup size that has been transmitted before and stored in the memory, in order to determine whether or not the backup size will increase.

When the new backup size is larger than the current backup size (refer to the YES route in step B2), a process according to an increase in the backup size is performed (step B3). That is, when the backup size will increase, the processing in steps B5 to B11 illustrated in FIG. 5 is performed.

First, the determination section 41 determines a first target amount of charge [X %] of the battery 43. However, the sum of the first target amount of charge [X %] of the battery 43 and the full charge capacity [10%] of the capacitor 44 is assumed to equal the target amount of charge [Y %]. The charge control section 42 causes the charger 402 to begin to charge the battery 43 and the capacitor 44 (step B5). That is, the charge control section 42 charges the battery 43 to the first target amount of charge [X %] of the battery 43 and the capacitor 44 to full charge [10%].

The charge control section 42 checks whether or not the total amount of charge of the battery 43 and the capacitor 44 is larger than the target amount of charge [Y=(X+10)%] (step B6). When the total amount of charge is smaller than or equal to the target amount of charge (refer to the NO route in step B6), step B6 is repeatedly performed until the total amount of charge becomes larger than the target amount of charge. When the total amount of charge is larger than the target amount of charge (refer to the YES route in step B6), the charge control section 42 notifies the CPU 301 of completion of the charge, and the size changing section 308 (the CPU 301) changes the size (backup size) of the backup target region of the cache memory 306 to a GB (step B7).

Thus, in the BPSU 40, after it is confirmed that the total amount of charge of the battery 43 and the capacitor 44 is larger than the target amount of charge [Y=(X+10)%], the size of the backup target region of the cache memory 306 is changed. Therefore, even when a power failure occurs, data stored in the backup target region may be backed up in the nonvolatile memory 307 using the total amount of charge of the battery 43 and the capacitor 44, which improves reliability.

In addition, by charging the capacitor 44, which may be fully charged in a short period of time, in parallel with the battery 43, the time taken for the total amount of charge to reach the target amount of charge may be reduced. At this moment, the amount of charge of the battery 43 is X %, and the amount of charge of the capacitor 44 is 10% (full charge) (step B8). The charge control section 42 checks whether or not the size changing section 308 has issued a new notification of a change in the backup size before a predetermined period of time (for example, 3 hours) has elapsed since the backup size after the change was transmitted from the size changing section 308 in step B1 (step B9). When a new notification of a change in the backup size has not been issued (refer to the NO route in step B9), the charge control section 42 charges the battery 43 to the target amount of charge [Y=(X+10)%]. When the charge control section 42 has confirmed that the amount of charge of the battery 43 has reached the target amount of charge, the charge control section 42 causes the capacitor 44 to discharge until the amount of charge of the capacitor 44 becomes 0% (step B10). Therefore, the amount of charge of the battery 43 is the target amount of charge [50%] and the amount of charge of the capacitor 44 is 0% (step B11), and then the process ends.

On the other hand, when a new notification of a change in the backup size has been issued (refer to the YES route in step B9), the process ends and returns to step B1 illustrated in FIG. 4. That is, the charge control of the battery 43 and the capacitor 44 begins on the basis of the new backup size. By beginning to charge the battery 43 after confirming that a new notification of a change in the backup size has not been issued until the certain period of time has elapsed since the backup size after the change was transmitted from the size changing section 308, the number of times of charging of the battery 43 may be reduced. Therefore, the life of the battery 43 may be prolonged.

On the other hand, when the new backup size is smaller than or equal to the current backup size (refer to the NO route in step B2), a process according to a decrease in the backup size is performed (step B4). That is, when the backup size will decrease, the processing in steps B12 to B17 illustrated in FIG. 6 is performed.

In an example that will be described hereinafter, the target amount of charge [Y %] is assumed to equal the current total amount of charge [Z %] from which 10% has been subtracted.

The size changing section 308 (the CPU 301) changes the size (backup size) of the backup target region of the cache memory 306 to a GB (step B12).

The determination section 41 checks the amount of charge of the capacitor 44 (step B13). That is, the determination section 41 checks whether or not the amount of charge of the capacitor 44 is 0%. When the amount of charge of the capacitor 44 is 0% (refer to the YES route in step B13), the charge control section 42 checks whether or not the size changing section 308 has issued a new notification of a change in the backup size before a predetermined period of time (for example, 3 hours) has elapsed since the backup size after the change was transmitted from the size changing section 308 in step B1 (step B14).

When a new notification of a change in the backup size has not been issued (refer to the NO route in step B14), the charge control section 42 causes the battery 43 to discharge to the target amount of charge [Y=(Z−10)%]. The amount of charge of the capacitor 44 is 0% and does not change (step B15). Therefore, the amount of charge of the battery 43 is the target amount of charge [Y=(Z−10)%] and the amount of charge of the capacitor 44 is 0% (step B16), and then the process ends.

On the other hand, when a new notification of a change in the backup size has been issued (refer to the YES route in step B14), the process ends and returns to step B1 illustrated in FIG. 4. That is, the charge control of the battery 43 and the capacitor 44 begins on the basis of the new backup size.

By beginning to cause the battery 43 to discharge after confirming that a new notification of a change in the backup size has not been issued until the certain period of time has elapsed since the backup size after the change was transmitted from the size changing section 308, the number of times of discharge of the battery 43 may be reduced. Therefore, the life of the battery 43 may be prolonged.

On the other hand, when the amount of charge of the capacitor 44 is not 0%, that is, when the amount of charge of the capacitor 44 is 10% (refer to the NO route in step B13), the amount of charge of the battery 43 is (Z−10)%. Therefore, the charge control section 42 causes the capacitor 44 to discharge until the amount of charge of the capacitor 44 becomes 0% (step B17). By causing the capacitor 44 to discharge first in order to achieve the target amount of charge, the number of times of discharge of the battery 43 may be reduced, thereby prolonging the life of the battery 43.

Thereafter, the process proceeds to step B16. That is, the amount of charge of the battery 43 is the target amount of charge [Y=(Z−10)%] and the amount of charge of the capacitor 44 is 0%, and then the process ends.

Although an example in which the target amount of charge [Y %] equals the current total amount of charge [Z %] from which 10% has been subtracted is illustrated in FIG. 6, the embodiment is not limited to this. For example, when the amount of charge of the battery 43 is larger than the target amount of charge even when the capacitor 44 discharges, the battery 43 may be caused to discharge to the target amount of charge in step B17, instead. Various other modifications may be implemented.

(B) Simultaneous Use of Battery and Capacitor

A method for simultaneously using the battery 43 and the capacitor 44 in the storage apparatus 10 will be described hereinafter.

(B-1) First Method for Operating Battery

FIGS. 7 to 10 are diagrams illustrating a first method for operating the BPSU 40 in the storage apparatus 10 as an example of the embodiment, and illustrate charge states of the battery 43 and the capacitor 44.

The battery 43 includes a plurality of battery cells. In the first method for operating the BPSU 40, the plurality of battery cells included in the battery 43 are unevenly charged. More specifically, the battery cells are sequentially charged to full capacity one by one during charging.

An example in which a total amount of change of 50% is increased to a target amount of charge of 60% will be described hereinafter.

Figure 7:
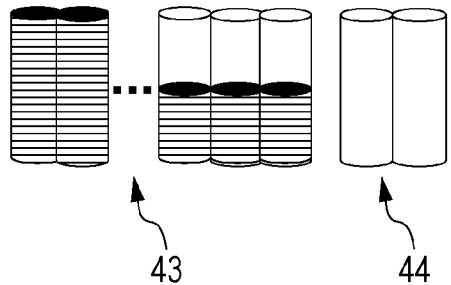
FIG. 7 is a diagram illustrating a first method for operating the BPSU in the storage apparatus as an example of the embodiment.

In a first state illustrated in FIG. 7, the amount of charge of the battery 43 is about 50% and the amount of charge of the capacitor 44 is 0%, which means that the total amount of charge is about 50%. Some of the plurality of cells included in the battery 43 have been fully charged, and the other cells have been charged to about 50%. Because the cells of the battery 43 deteriorate when the amounts of charge are 0%, the amounts of charge of the cells that have not been fully charged are set to about 50%.

Figure 8:
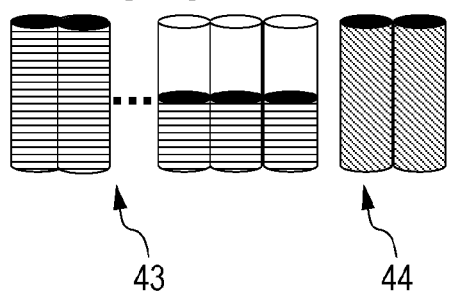
FIG. 8 is a diagram illustrating the first method for operating the BPSU in the storage apparatus as an example of the embodiment.

As indicated by a second state illustrated in FIG. 8, first, the charge control section 42 fully charges the capacitor 44. Therefore, the amount of charge of the battery 43 is about 50% (no change) and the amount of charge of the capacitor 44 is 10%, which means that the total amount of charge is about 60%. The capacitor 44 may be fully changed in a short period of time, namely, for example, in a several seconds after the charging of the capacitor 44 begins.

Figure 9:
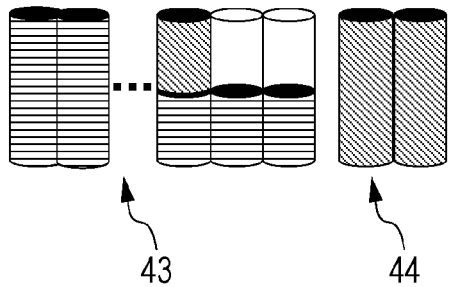
FIG. 9 is a diagram illustrating the first method for operating the BPSU in the storage apparatus as an example of the embodiment.

Thereafter, when the size changing section 308 does not change the size of the backup target region for a certain period of time and therefore the size changing section 308 does not issue a new notification of a change in the backup size, the charge control section 42 begins to charge one of the cells of the battery 43 that have not been fully charged until the cell is fully charged as indicated by a third state illustrated in FIG. 9. In the third state, the amount of charge of the battery 43 is about 60% and the amount of charge of the capacitor 44 is 10%, which means that the total amount of charge is about 70%.

Figure 10:
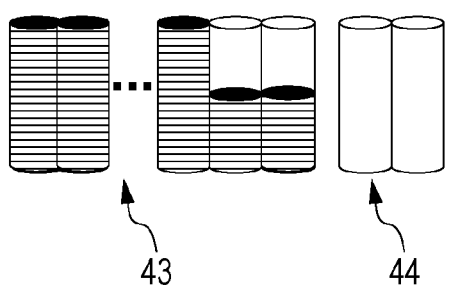
FIG. 10 is a diagram illustrating the first method for operating the BPSU in the storage apparatus as an example of the embodiment.

The charge control section 42 then, as indicated by a fourth state illustrated in FIG. 10, causes the capacitor 44 to discharge in order to suppress deterioration of the capacitor 44. Therefore, in the fourth state, the amount of charge of the battery 43 is 60%, which is the target amount of charge, and the amount of charge of the capacitor 44 is 0%.

(B-2) Second Method for Operating Battery

FIGS. 11 to 14 are diagrams illustrating a second method for operating the BPSU 40 in the storage apparatus 10 as an example of the embodiment, and illustrate charge states of the battery 43 and the capacitor 44.

The battery 43 includes a plurality of battery cells. In the second method for operating the BPSU 40, the plurality of battery cells included in the battery 43 are evenly charged.

An example in which a total amount of charge of 50% is increased to a target amount of charge of 60% will be described hereinafter.

In a first state illustrated in FIG. 11, the amount of charge of the battery 43 is 50% and the amount of charge of the capacitor 44 is 0%, which means that the total amount of charge is 50%.

As indicated by a second state illustrated in FIG. 12, first, the charge control section 42 fully charges the capacitor 44. Therefore, the amount of charge of the battery 43 is about 50% and the amount of charge of the capacitor 44 is 10%, which means that the total amount of charge is about 60%. The capacitor 44 may be fully changed in a short period of time, namely, for example, in a several seconds after the charging of the capacitor 44 begins.

Thereafter, when the size changing section 308 does not change the size of the backup target region for a certain period of time and therefore the size changing section 308 does not issue a new notification of a change in the backup size, the charge control section 42 begins to charge the battery 43 until the amount of charge of the battery 43 increases from 50% to 60% as indicated by a third state illustrated in FIG. 13. In the third state, the amount of charge of the battery 43 is 60% and the amount of charge of the capacitor 44 is 10%, which means that the total amount of charge is 70%.

The charge control section 42 then, as indicated by a fourth state illustrated in FIG. 14, causes the capacitor 44 to discharge in order to suppress deterioration of the capacitor 44. Therefore, in the fourth state, the amount of charge of the battery 43 is 60%, which is the target amount of charge, and the amount of charge of the capacitor 44 is 0%.

According to the second method for operating the battery 43, in the charger 402, a control circuit for each cell of the battery 43 is not used, and therefore the size of the storage apparatus 10 may be reduced, thereby reducing manufacturing cost.

(C) Advantageous Effects

According to the storage apparatus 10 as an example of the embodiment, the battery 43 is charged to the target amount of charge according to the size of the backup target region of the cache memory 306. Therefore, the time for which the battery 43 remains fully charged may be reduced, thereby suppressing deterioration of the battery 43 and prolonging the life of the battery 43. That is, the frequency of performing an operation for replacing the battery 43 may be reduced, and therefore the frequency of performing maintenance may also be reduced.

When the capacitor 44 is included along with the battery 43 and the total amount of charge is to be changed, the capacitor 44 is charged or caused to discharge first. In doing so, the number of times of charge and discharge of the battery 43 may be reduced, thereby suppressing deterioration of the battery 43 and prolonging the life of the battery 43.

When the total amount of charge is to be changed, the time taken to achieve the target amount of charge may be reduced by charging the capacitor 44 or causing the capacitor 44 to discharge first, since the time taken to charge the capacitor 44 or to cause the capacitor 44 to discharge is shorter than the time taken to charge the battery 43 or to cause the battery 43 to discharge. That is, the total amount of charge may be quickly changed. Therefore, for example, the time taken to switch from the write through mode to the write back mode may be reduced during, for example, activation of the storage apparatus 10 or the like.

Furthermore, by causing the capacitor 44 to discharge when the amount of charge of the battery 43 has reached the target amount of charge, deterioration of the capacitor 44 may be suppressed and the life of the capacitor 44 may be prolonged. That is, the frequency of performing an operation for replacing the capacitor 44 may be reduced, and therefore the frequency of performing maintenance may also be reduced.

By charging the battery 43 or causing the battery 43 to discharge after confirming that a new notification of a change in the backup size has not been issued until a certain period of time has elapsed since a backup size after a change was transmitted from the size changing section 308, the number of times of charge and discharge of the battery 43 may be reduced. Therefore, the life of the battery 43 may be prolonged.

(D) Modifications

Various modifications may be implemented without deviating from the scope of the embodiment, regardless of the above-described embodiment.

(D-1) First Modification

Although the capacitor 44 is caused to discharge after the battery 43 reaches the target amount of charge in the above-described embodiment, the embodiment is not limited to this.

As known in the art, the battery 43 has a discharge lower limit voltage. On the other hand, the capacitor 44 is not affected even when the capacitor 44 discharges to low voltage. Therefore, the waste of energy may be reduced by using the battery 43 to discharge at high voltage and the capacitor 44 to discharge at low voltage.

Figure 15:
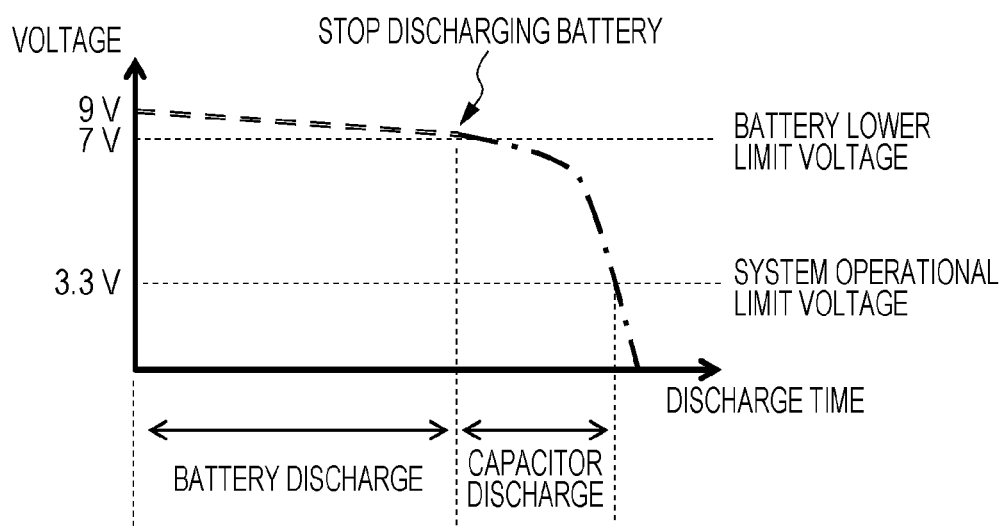
FIG. 15 is a diagram illustrating a method for combining a battery and a capacitor in a first modification of the storage apparatus as an example of the embodiment while considering the discharge characteristics of the battery and the capacitor.

FIG. 15 is a diagram illustrating a method for simultaneously using the battery 43 and the capacitor 44 according to a first modification of the storage apparatus 10 as an example of the embodiment while considering the discharge characteristics of the battery 43 and the capacitor 44.

In an example illustrated in FIG. 15, the discharge lower limit (lower limit voltage) of the battery 43 is 7 V, and the operational limit of the system is 3.3 V. The battery 43 is used for discharge at a time when the voltage is 9 V to 7 V, and the capacitor 44 is used for discharge at a time when the voltage is 7 V to 3.3 V.

Thus, by selecting and using the battery 43 or the capacitor 44 in accordance with discharge voltage, energy may be efficiently used.

(D-2) Second Modification

Although the battery 43 and the capacitor 44 are used in the above-described embodiment and modification, the embodiment is not limited to this. That is, another electricity storage device may be used instead of the battery 43 and the capacitor 44.

For example, a lithium-ion (Li-ion) capacitor that has intermediate characteristics of a battery and a capacitor is known.

FIG. 16 illustrates the characteristics of a lithium-ion battery, a lithium-ion capacitor, and a capacitor.

This lithium-ion capacitor may be used instead of the battery 43 or instead of the capacitor 44.

(D-3) Third Modification

Although the battery 43 and the capacitor 44 are used in the above-described embodiment and modification, the embodiment is not limited to this. That is, in the BPSU 40, power may be supplied only by the battery 43 without using the capacitor 44.

For example, when the storage apparatus 10 is used for backup in certain hours such as midnight, the amount of charge of the BPSU 40 does not have to necessarily be changed in a short period of time. In addition, for example, in an application such as delivery of moving images, in which the number of read requests is larger than the number of write requests, variation in a storage region of write data of the cache memory 306 is small.

In such an application of the storage apparatus 10, the capacitor 44, for which charge and discharge may be performed in a short period of time, does not have to be included in the BPSU 40. By constructing the storage apparatus 10 without mounting the capacitor 44, manufacturing cost may be reduced.

A process performed by the BPSU 40 during activation of the storage apparatus 10 according to a third modification of the embodiment will be described with reference to a flowchart (steps A11 to A16) of FIG. 17.

When power is supplied to the storage apparatus 10 or the storage apparatus 10 is reactivated, the size changing section 308 (the CPU 301) of the CM 30 notifies the determination section 41 of the BPSU 40 of the backup size (for example, 5 GB) (step A11). In the BPSU 40, the determination section 41 refers to the conversion table on the basis of the backup size, and determines the target amount of charge. In this example, the target amount of charge is assumed to be 50% of the total full charge capacity. In the following description, values in parentheses indicate percentages relative to the total full charge capacity.

In the BPSU 40, the charge control section 42 controls the charger 402 to begin to charge the battery 43 and the capacitor 44. More specifically, the battery 43 is charged to the target amount of charge (50%) (step A12). In this state, the storage apparatus 10 is operating in the write through mode.

The charge control section 42 checks whether or not the amount of charge of the battery 43 is larger than the target amount of charge (step A13). When the amount of charge of the battery 43 is smaller than or equal to the target amount of charge (refer to the NO route in step A13), step A13 is repeatedly performed until the amount of charge of the battery 43 becomes larger than the target amount of charge.

When the amount of charge of the battery 43 is larger than the target amount of charge (refer to the YES route in step A13), the charge control section 42 notifies the CPU 301 of completion of the charge, and the CPU 301 causes the storage apparatus 10 to enter the write back mode (step A14).

The storage apparatus 10 is now in the system ready state (step A15), in which the function as the storage apparatus 10 may be achieved. Therefore, the operation begins while the battery 43 is charged to the target amount of charge (50%) (step A16), and the process ends.

(D-4) Other Modifications

Although the size changing section 308 of the CM 30 notifies the BPSU 40 of the backup size and the determination section 41 of the BPSU 40 determines the target amount of charge on the basis of the backup size in the above-described embodiment and modifications, the embodiment is not limited to this. That is, the CPU 301 of the CM 30 may achieve the function as the determination section 41, and the CPU 301 may notify the controller 401 of the BPSU 40 of the target amount of charge. In doing so, loads on the controller 401 of the BPSU 40 may be reduced.

In addition, although the determination section 41 refers to the conversion table (conversion information) in which backup sizes and target amounts of charge are associated with each other in advance to determine the target amount of charge in the above-described embodiment, the embodiment is not limited to this.

For example, the target amount of charge may be determined by applying an arithmetic expression to the backup size, instead. Alternatively, charge time, the integrated amount of charge current, discharge time, and the integrated amount of discharge current may be used to calculate the target amount of charge. Alternatively, current may be caused to flow through resistors, which are not illustrated, connected in series at certain time intervals and the discharge characteristics may be obtained, and then, for example, the target amount of charge may be calculated on the basis of a discharge curve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device comprising:
   a cache memory configured to temporarily store data;
   a nonvolatile memory configured to store a copy of the data stored in the cache memory;
   a battery configured to supply power to the cache memory in a case of a power failure;
   a data save processing unit configured to save data stored in a backup target region of the cache memory to the nonvolatile memory in the case of the power failure; and
   a charge control unit configured to charge the battery up to a target amount of charge which is determined on the basis of a size of the backup target region;
   a capacitor configured to supply power to the cache memory in the case of the power failure,
   wherein the charge control unit charges the capacitor or causes the capacitor to discharge first when the target amount of charge is to be changed.

2. The control device according to claim 1, further comprising:
   a determination unit configured to determine the target amount of charge on the basis of the size of the backup target region,
   wherein the charge control unit charges the battery to the target amount of charge determined by the determination unit.

3. The control device according to claim 2, further comprising:
   a size changing unit configured to change the size of the backup target region of the cache memory,
   wherein the determination unit determine the target amount of charge on the basis of the size of the backup target region changed by the size changing unit.

4. The control device according to claim 1,
   wherein the charge control unit charges the battery and the capacitor, and, when an amount of charge of the battery has reached the target amount of charge, causes the capacitor to discharge.

5. The control device according to claim 1,
   wherein, during activation of the control device, the control device operates, until a sum of an amount of charge of the capacitor and the amount of charge of the battery charged by the charge control unit reaches the target amount of charge, in a write through mode, in which completion of writing is output to a higher apparatus when data has been stored in a memory device, and operates, after the sum of the amount of charge of the capacitor and the amount of charge of the battery charged by the charge control unit reaches the target amount of charge, in a write back mode, in which completion of writing is output to the higher apparatus when data has been stored in the cache memory.

6. The control device according to claim 1,
wherein
when the amount of charge of the battery is smaller than the target amount of charge, the charge control unit begins to charge both the battery and the capacitor and continues charging both the battery and the capacitor until a total amount of charge of both the battery and the capacitor reaches the target amount of charge, and
when the total amount of charges is larger than the target amount of charge, the charge control unit causes the capacitor to discharge first, and then causes the battery to discharge until the amount of charge of the battery alone reaches the target amount of charge.

7. A power supply device including a cache memory that temporarily stores data, a nonvolatile memory that saves data stored in the cache memory, and a data save processing unit that saves data stored in a backup target region of the cache memory to the nonvolatile memory in a case of a power failure, the power supply device comprising:
 a battery configured to supply power to the cache memory in the case of the power failure; and
 a charge control unit configured to charge the battery to a target amount of charge according to a size of the backup target region;
 a capacitor configured to supply power to the cache memory in the case of the power failure,
 wherein the charge control unit charges the capacitor or causes the capacitor to discharge first when the target amount of charge is to be changed.

8. The power supply device according to claim 7, wherein the charge control unit charges the battery and the capacitor, and, when an amount of charge of the battery has reached the target amount of charge, causes the capacitor to discharge.

9. A method for controlling power used in a storage apparatus that includes a cache memory which temporarily stores data, a nonvolatile memory which saves data stored in the cache memory, a battery which supplies power to the cache memory in a case of a power failure, and a data save processing unit which saves data stored in a backup target region of the cache memory to the nonvolatile memory in the case of the power failure and that accesses a memory device in accordance with a data access request from a higher apparatus, the method comprising:
 determining a target amount of charge according to a size of the backup target region; and
 charging the battery up to the target amount of charge,
 wherein the storage apparatus includes a capacitor that supplies power to the cache memory in the case of the power failure, and
 wherein the capacitor is charged or caused to discharge first when the target amount of charge is to be changed.

10. The method for controlling power according to claim 9,
Wherein the battery and the capacitor are charged, and, when an amount of charge of the battery has reached the target amount of charge, the capacitor is caused to discharge.

11. The method for controlling power according to claim 9,
wherein, during activation of the storage apparatus, the storage apparatus operates, until a sum of an amount of charge of the capacitor and the amount of charge of the battery that have been charged reaches the target amount of charge, in a write through mode, in which completion of writing is output to the higher apparatus when data has been stored in the memory device, and operates, after the sum of the amount of charge of the capacitor and the amount of charge of the battery that have been charged reaches the target amount of charge, in a write back mode, in which completion of writing is output to the higher apparatus when data has been stored in the cache memory.

12. The method for controlling power according to claim 9,
wherein the size of the backup target region of the cache memory is changed, and
wherein the target amount of charge is determined on the basis of the size of the changed backup target region.

* * * * *